United States Patent
Chatard et al.

(10) Patent No.: US 6,926,506 B2
(45) Date of Patent: Aug. 9, 2005

(54) DEVICE FOR PRODUCING PLASTIC CONTAINERS BY STRETCH BLOW FORMING

(75) Inventors: Dominique Chatard, Heidelberg (DE); Jens Fuchs, Uelvershem (DE); Hans Kindinger, Wilmshausen (DE); Rolf Kuhn, Ingelheim (DE); Rudiger Wlach, Buttelborn (DE); Lothar Wilhelm, Karben (DE)

(73) Assignee: Tetra Laval Holdings & Finance S.A. (CH)

( * ) Notice: Subject to any disclaimer, the term of this patent is extended or adjusted under 35 U.S.C. 154(b) by 237 days.

(21) Appl. No.: 10/451,549

(22) PCT Filed: Dec. 14, 2001

(86) PCT No.: PCT/EP01/14743
§ 371 (c)(1),
(2), (4) Date: Jun. 10, 2003

(87) PCT Pub. No.: WO02/053351
PCT Pub. Date: Jul. 11, 2002

(65) Prior Publication Data
US 2004/0028761 A1  Feb. 12, 2004

(30) Foreign Application Priority Data
Dec. 29, 2000  (DE) .......................................... 100 65 652

(51) Int. Cl.[7] .......................... B29C 49/12; B29C 49/46
(52) U.S. Cl. .............................. 425/1; 264/84; 425/529; 425/535
(58) Field of Search ........................... 425/1, 529, 535; 264/84

(56) References Cited

U.S. PATENT DOCUMENTS 6,796,780 B1 * 9/2004  Chatard et al. ................ 425/1

FOREIGN PATENT DOCUMENTS

| DE | 696 07 636 T2 | 11/2000 | | |
|---|---|---|---|---|
| GB | 1026056 | 4/1966 | | |
| WO | WO 97/13632 | 4/1997 | | |
| WO | WO 9806559 A1 * | 2/1998 | .......... | B29C/49/46 |
| WO | WO 0112416 A1 * | 2/2001 | .......... | B29C/49/46 |

* cited by examiner

Primary Examiner—Robert B. Davis
(74) Attorney, Agent, or Firm—Michael L. Dunn

(57) ABSTRACT

The invention relates to a device for producing containers from a plastic material that can be shaped by means of stretch blow forming and whose inner space corresponds to the finished container, said container being retained on its open end by a receiving element with gas flow pipes. A moveable stretch die (1) is axially guided through the receiving element and an ignition device is mounted in order to ignite an explosive gas mixture inside the container. In order to produce plastic containers having a better outer appearance, such as a substantially clear, transparent wall, and improve reliability of production, the receiving element can be engaged in a fluidically tight manner with the main distribution block (2) by the end thereof that faces the container, the stretching die (1) being movably guided through said distribution block in the axial extension of the receiving element. At least one first fluidic connection (13) is provided in a first area of the main distribution block (2) facing away from the container, and an additional fluidic connection (14) is provided in an opposite second area of the main distribution block (2) facing the container. The pipes (26, 14, 15) from the two fluidic connections (13, 14) in the second area in the main distribution block (2) are connected together. A single common flow channel (15) is formed between the connecting point (16) and the receiving element.

20 Claims, 2 Drawing Sheets

DEVICE FOR PRODUCING PLASTIC CONTAINERS BY STRETCH BLOW FORMING

Figure 1:
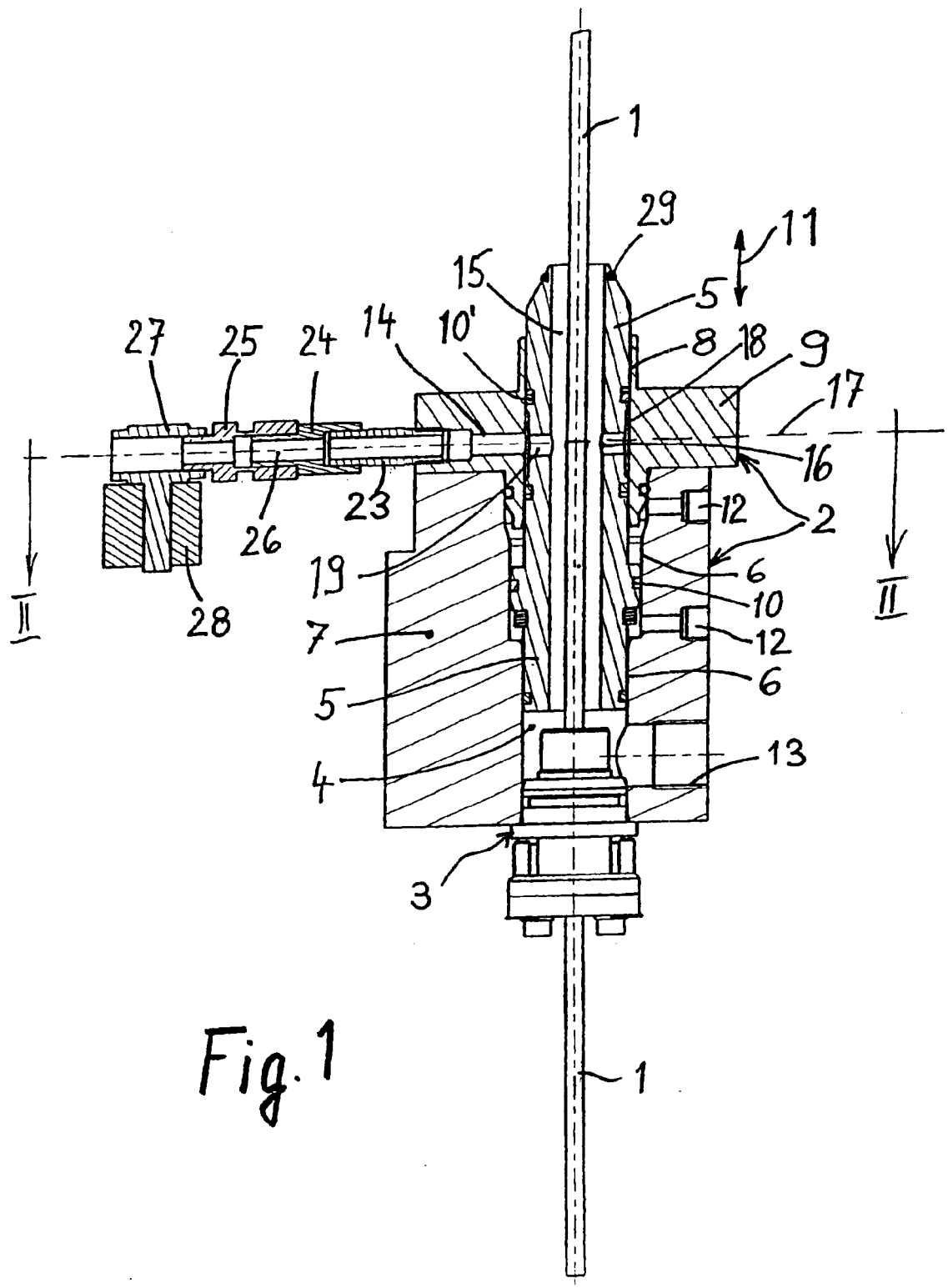

The invention relates to a device for the production of containers from a plastic which is deformable by stretch blow moulding with a mould, the inner space of which corresponds to that of the finished container, which is held at its open end with a holder with gas supply lines, a moveable stretching die being guided axially through the holder and an ignition device being arranged in order to ignite an explosive gas mixture inside the container.

From the international publication numbered WO98/06559 a device of the type described above for the production of containers made from plastic is known, for example of bottles made from polyethylene terephthalate (PET). These PET bottles are produced by first heating a blank up to a temperature suitable for stretch blowing of approximately 100–120° C. and introducing it into a tool mould. The blank is axially stretched by means of a moveable stretching die. While the stretching pressure is produced by blowing an explosive gas mixture into the blank, for example a mixture of oxyhydrogen and an inert gas, a blowing pressure is produced by ignition of the explosive gas mixture, and this blowing pressure presses the wall of the intermediate blank/the partly pre-formed container completely against the inner wall of the mould. The explosive gas mixture is a mixture of an oxidizing agent and an oxidizable constituent, such as for example hydrogen, methane or the like.

On technical grounds, it has been shown that containers produced with the known device could not be used industrially. With respect to form and volume and also with respect to their visual appearance, it has not been possible to produce and reproduce them in sufficient quality. It has not, for example, been possible to produce PET bottles with clear, transparent walls. It was suspected that this sometimes unpleasant appearance, insofar as it was not intentionally brought about, or for specific reasons could be accepted, arose due to unavoidable temperature influences.

It has already been proposed in-house, to bring the holder at its end facing away from the container into flow-agent-tight engagement with a main distribution block, through which the stretching die can be moveably passed in axial extension of the holder, and on which at least one flow-agent connection is fitted. An inner space is created on the device side, which can preferably be closed by valves, the ignition device being filled in the inner space on the device side. In the course of the production process, the holder is in one stage brought into tight engagement with the distributor block and in the other stage out of engagement with the distributor block. In the stretching stage the stretching die is passed through the distributor block and thus also moveably passed axially through the holder.

In the one version of this older proposal, the inner space on the device side is formed by the closed-together device parts of main distributor block, holder and container sitting in the mould. In this version, flow agent is passed through the at least one flow-agent connection into the main distributor block and through same into the holder and the container.

In a further version the inner space on the device side is formed only by the container and the holder arranged thereon, if for example the main distributor block is separated from the holder and the holder is closed. The stamping die is axially passed through the holder.

Each of the different inner spaces on the device side (depending on the embodiment) can be sealed in the region of the at least one flow-agent connection. Only in a sealed inner space on the device side with a small volume does the explosion, caused by the ignition device additionally arranged there, lead to the desired parameters of short-term high pressure and higher temperature. It is self-evident that these inner spaces can be re-opened after completion of the production process. The volume on the device side, which is involved in the enclosing of the explosion space, is so small that a considerably lower quantity of reaction products remains, if oxyhydrogen, e.g. water, is used.

The sealing of the small inner space on the device side in particular does not allow an accumulation of the undesired reaction products (water), due to the fact that at least the container itself, preferably even the container with holder, is removed after the explosion, and the accumulated reaction products with same. In the remaining inner space on the device side, imperceptible quantities of reaction products therefore remain, which themselves can remain negligible in the case of a continuous production process after a longer period.

The object of the invention is to improve a device of the type initially mentioned in such a way that plastic containers can be produced more reliably and with a better appearance, for example with largely clear, transparent walls.

While, in the case of the older in-house proposal, it had been established that sometimes the detonation triggered by the ignition was locally particularly strong in the container, whereas on the other hand at points at a distance from the direct hydrogen inlet no detonation resulted, it was desirable here to achieve a uniformity of the explosion and its effect.

According to the invention, this object is achieved in that the holder, at its end facing away from the container can be brought into flow-agent-tight engagement with a main distributor block, through which the stretching die can be moveably passed in axial extension of the holder, in that at least one first flow-agent connection is provided in a first region of the main distributor block facing away from the container, and a second flow-agent connection is provided in the opposite, second region facing away from the container, in that the lines from the at least two flow-agent connections, in the second region of the main distributor block are in connection with one another, and in that between the connection point and the holder, a single, shared flow channel is formed. In the case of the device according to the older proposal, the hydrogen, as the one flow agent, was taken out of the supply line, as high up as possible on the container to be produced, preferably in the container itself, preferably in proximity to the ignition device. This resulted in the mixing of the hydrogen as an oxidizable constituent of the flow-agent mixture with the other constituents, wherein an oxidation agent is also to be found, first in the region of the outlet and particularly first in the container. The mixture of the constituents into the explosive gas mixture therefore did not reliably take place completely. There was not always an homogeneous mixture with the mentioned disadvantages of only local explosions. Optimally, the detonation takes place when there is a stoichiometric mixture. Attempts have already been made to allow the individual mixture constituents to flow in, for example staggered by a timer control. However, such a control is expensive in terms of resources and money.

If the first flow-agent connection according to the invention, or the several first flow-agent connections in the first region of the main distributor block facing away from the container to be produced are used, then for example oxidation agent can be introduced through this connection, or a mixture with oxidation agent or even air. If the second flow-agent connection is situated nearer to the container, and if the oxidizable constituent, such as for example hydrogen or methane, is passed through same, then it is possible to ensure that scarcely any oxidizable constituent remains in the farther first region of the main distributor block, which results in a good mixing or good mixing-in of the oxidizable constituent into the other flow agents, producing a uniform and good detonation.

The mixing of the different flow-agent constituents takes place at the connection point, at which the lines from the two flow-agent connections are in connection with one another, particularly as only one single flow channel, through which all flow agents have to flow, is present from the connection point onwards in the flow direction to the container. They are mixed on this flow route, with the result that, corresponding to the quantity of oxidizable constituent (hydrogen or methane), an almost stoichiometric distribution is achieved, which is homogeneous almost throughout the whole space of the container to be produced.

By means of the invention, the oxidizable constituent (hydrogen, methane, etc.) can be introduced into a running flow-agent flow in measured quantities. Determination of the respective dose is carried out over time, i.e. via the opening of a supply line until closing of same. The other flow agents, in particular the oxidation agent, can also preferably be controlled over time, with respect to its quantity, in such a way that these flow agents flow after the opening of a supply line valve, until this valve is closed again. According to the invention, the time duration between opening and closing for the flow agent with the oxidation agent is longer than for the oxidizable agent. This ensures that the flow agents with the oxidation agent still flow past the connection point, if the flow agent with the oxidizable constituent has already been cut off. The result of this is that, in the region downstream of the connection point, there is scarcely any flow agent with the oxidizable constituent. The explosion will therefore not be propagated into the region of the main distributor block at a distance from the container.

If, in a certain version, the arrangement of the stretching die is observed essentially in plumb-line direction, the container to be produced then being arranged at the top, then the main distributor block is situated at a distance from same at the bottom, and also below the holder, and the first region of the main distributor block is situated at the bottom, the second region at the top closer to the container. During operation, air can be used as a flow agent for the oxidation constituents. The air then flows in at the bottom and upwards through the main distributor block, in such a way that after all the valves are closed, it is possible to refer to an air column, which reaches from the lower, distant second region at least as far as approximately the middle region of the main distributor block. As a result of the flowing of the air after the oxidizable constituent is cut off, the latter is carried along past the connection point upwards. From the flowing in/connection point of the two flow agents upwards closer to the container, there is then no longer any oxidizable flow agent. No oxyhydrogen can therefore develop in the region underneath and at a greater distance from the container, and thus neither can a possibly dangerous explosion occur here, nor a reaction product form—i.e. water in the case of oxyhydrogen.

In the case of a preferred version of the invention, it is expedient if air is taken as an oxidation agent and hydrogen as an oxidizable constituent and if 30 milliseconds after opening the air valves, the valve for hydrogen is opened. Hydrogen then flows in during a period of 90 milliseconds to 140 milliseconds, depending on the size of the container to be produced, for example, a bottle-shaped container or a plastic bottle. Subsequently the hydrogen supply is cut off, and air still flows past the connection point in the direction of the container to be produced. The air flows for 250 milliseconds. Then its supply valve is also closed. Tests with these values have resulted in a uniform and good detonation/explosion of the gas mixture in the container to be produced. The ignition signal is moreover triggered directly after the last closing of the last air valve.

In the case of a further advantageous version of the invention, the second flow-agent connection has a rigid, short connection tube with a firmly fitted control valve. The supply line for the oxidizable flow agent (for example hydrogen or methane) is unmoveable and favours a high safety aspect. The rigidly laid pipes can be connected with one another by welding, resulting in the highest safety standard. If flexible tubes are avoided and the rigid, short connection pipes are used, the enclosed volume can be precisely defined, so that the quantity of constituents of the mixture to be prepared can be determined more precisely. In a particularly preferred version of the invention, the connection pipe from the main distributor block to the control valve preferably has a length of 5 to 20 mm and is quite particularly favourably constructed, if it is approximately 10 mm long.

According to the invention it is also favourable if there is provided in the preferably stationary main distributor block a driven hollow piston which is moveable axially relative to same and which, on its outer end facing the holder, has a ring-shaped lock-washer surface matching the holder. The main distributor block can also be designed in one piece and connected with a correspondingly moved holder in such a way that this connection between holder and main distributor block can be loosened in a controlled manner. However, the loosening is carried out particularly favourably by means of the above measure with the hollow piston. In order to connect the main distributor block to the holder/to release it from same, neither the main distributor block nor the holder in fact needs to be moved axially—approximately in the direction of the hollow stretching die—because the hollow piston is moveably driven axially, preferably pneumatically. At its outer end, the hollow piston carries a lock-washer surface matching the holder, which during connection of the holder to the main distributor block enters into tight engagement with the sealing surface of the holder. After the blowing and sterilization process, the movement of the hollow piston is reversed, the sealing surface disengages from the lock-washer surface, and then the holder can be shifted vertically to the direction of its longitudinal axis in the manner described above. This shifting takes place each time after a blowing/sterilization process of the production process operating step-by-step.

Furthermore, according to the invention it is expedient if the main distributor block consists of a distributor block and a hollow adapter. The latter can be put onto the side of the main distributor block facing the container and fastened there, so that both parts (distributor block and adapter) form a solid, quasi-single-part main distributor block, wherein however, in the case of a retrofit of the supply line for the oxidizing constituents, only the adapter would need to be retrofitted or reconstructed, for this purpose would need to be removed from the distributor block and exchanged.

A further advantageous design of the invention is that the holder is hollow and has a sealing surface at its end facing away from the container, through which the stretching die is moveably passed in axial extension of the holder. The holder is preferably hollow, so that the stretching die can be moved through the whole, elongatedly designed holder from its one end axially to its opposite end. Nevertheless, the holder can be connected in flow-agent-tight manner with the distributor block, by means of the sealing surface which extends around the space for the stretching die and is therefore ring-shaped. It is favourable if the stretching die is passed through this ring-shaped sealing surface in flow-agent-tight manner, so that optionally flow-agents, preferably gases, can be pushed out of the distributor block by the holder into the container to be produced, without the gases escaping outside the device. Due to the hollow design of the holder, not only can the stretching die therefore be passed through into the container, and withdrawn again from same, but flow agents can also be passed between the outer surface of the stretching die and the inner surface of the holder into the container, and in addition the volume inside the holder is kept relatively small. In particular, the space provided for the explosion can be limited to the inner space mentioned, on the device side, so that in the supply lines, chemical reactions which create reaction products can safely be prevented.

According to the invention, it is further expedient if, in the region of the hollow stamping die facing the container, an ignition device is fitted and electrically connected to a control unit preferably via cables passing through the hollow stamping die. With such a design of the hollow stretching die, the ignition of the explosive flow-agent mixture can take place almost in the centre of the container to be produced. Device parts situated further outside the container can then, depending on the process, be uncoupled or closed. The actuation of the ignition device via the cable or pcb track is carried out just as advantageously by means of the hollow design of the stretching die.

According to the invention, it is advantageous if the holder is moveably driven perpendicularly to its longitudinal central axis. As a result, it is surprisingly possible to separately remove a large part of the inner space on the device side, namely the space in the hollow holder, after each stretching and blowing process, i.e. in particular after each combustion, from the otherwise stationary device, for example the main distributor block with the hollow piston, together with the reaction products adhering to the walls. All these reaction products take no further part in the next process of stretching and blowing and in particular in the chemical combustion process. The inner space on the device side, which can optionally have adhering reaction products, is then limited to the space in the hollow die and in the main distributor block. If oxyhydrogen is used, so little water is carried along as reaction product into the next combustion process, that there is no risk of the inner walls of the container being adversely affected during and after the explosion.

Furthermore, according to the invention a sealing duct can be fitted in the main distributor block in alignment with the hollow piston to guide the stretching die. This allows the stretching die to move in axial direction through the main distributor block, its hollow piston, the downstream holder and into the holder or out of these parts, although the inner space on the device side remains sealed gas-tight.

It may also be noted that pressure sensors and temperature measuring equipment can be arranged at various points in the device, preferably in the region of the main distributor block, but also in the hollow stretching die.

It is self-evident that the ignition device can be based on different physical principles. The ignition of the media mixture takes place in the simplest case electrically via a spark gap, which consists for example of a spark plug, which can be fitted onto the stretching die or the distributor; or by means of static discharge. In addition, other ignition methods are also possible, for example by irradiation of electromagnetic energy, approximately in the form of a laser, high-frequency or microwave pulse or else by means of a catalytic process.

A practical version according to the invention is furthermore characterized in that the ignition device is fitted in the main distributor block. The stretching die is then surrounded by the space in the main distributor block, the space between stretching die and hollow piston and that between stretching die and holder at a distance. This distance signifies an annular space, which can be regarded as a flow-agent channel, and designed accordingly. In the case of a large design, larger quantities of flow agent can be pumped into the container and in the opposite direction. The explosion triggered by the ignition device in the main distributor block is then propagated very rapidly throughout the space filled with flow agent and water. This space is limited on the outside by the non-return valves on the lines on the distributor block.

Using the measures according to the invention, it is possible to control the explosion only via the quantity of the introduced oxidizable constituent of the mixture. A homogeneous distribution of the constituents of the gas mixture is achieved. During the time in which air is allowed to flow in as a flow-agent mixture with the oxidation agent, hydrogen or methane is introduced over a shorter time with later opening and earlier closing, so that as from the introduction or connection point, the vorticities ensure good mixing, so that the gases then arriving in the container to be produced are then well and homogenously mixed. In the region of the main distributor block facing away from the container, there will then be scarcely any oxidizable constituents of the explosive mixture, so that the explosion is not continued into the main distributor block.

Figure 2:
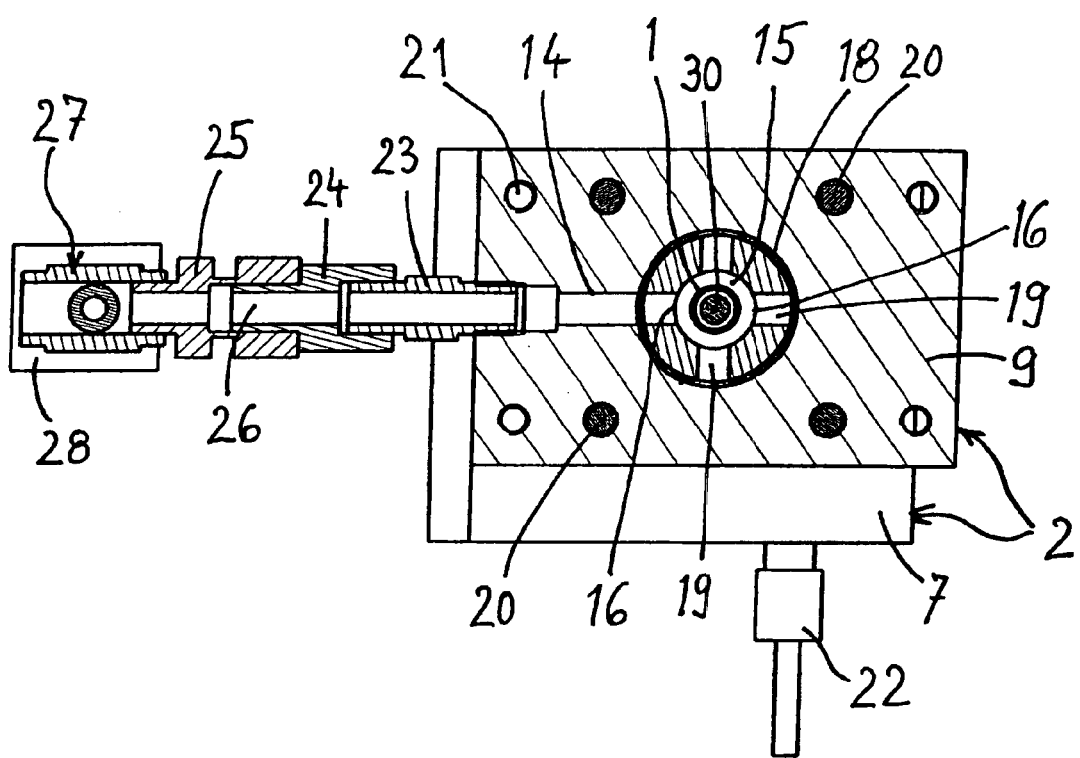

Further advantages, features and possible applications of the present invention result from the following description in conjunction with the attached drawings, which show preferred versions. There are represented in:

FIG. 1 the main distributor block in section, with the stretching die passed centrally through same, and the second flow-agent connection running perpendicularly to it, through which oxidizable constituents can be supplied, and FIG. 2 a cross-section along the line II—II in FIG. 1.

Not represented is the container to be produced, in this case bottle-shaped, made from plastic, for example PET. The PET container is to be imagined with its open end downwards. It is connected in a sealing manner with the top edge of the holder, not shown, and then held by same. The holder is in sleeve-form, and is freely moveable vis-à-vis the supply lines and other tool parts in one direction perpendicularly through the stretching die 1, which is shown as a thin hollow pipe, and passes through the centre of the main distributor block generally designated 2. The stretching die 1 is axially not only passed through the holder, which is not represented, but passes through a sealing duct 3, the inner space 4 on the device side and at a distance a hollow piston 5, which sits in a sealing manner in the vertical continuous bore 6 of the distributor block 7 and also the vertical continuous bore 8 of the adapter 9. For example, the piston seal 10 in the middle of the distributor block 7 and the piston seal 10' in the upper first region of the main distributor block 2 (here on the adapter 9) can be recognized here.

The hollow-designed distributor block 7 forms, together with the adapter 9 which is also hollow, the main distributor block, overall designated 2. Distributor block 7 and adapter 9 are firmly fitted to one another. Relative to these on the other hand, the hollow piston 5 can be moved vertically upwards and downwards, parallel to the longitudinal extension of the stretching die 1 in this version. This possible movement of the hollow piston 5 is represented by the double arrow 11. Pneumatic connections 12 allow the control of the movement of the hollow piston 5 corresponding to the double arrow 11.

The main distributor block 2 has, in a first region facing away from the bottle-shaped container to be imagined vertically above, a first flow-agent connection 13 through which for example air is pushed through a supply line, which is not represented, with controllable valves, into the inner space 4 on the device side.

The second flow-agent connection 14 (for example for the oxidizable flow agent, hydrogen or methane) is provided in the opposite, second region of the main distributor block 2 facing the container above.

The hollow cylinder 5 is provided with a central flow channel 15, which represents a duct for the air blown into the lower region, and for the mixture of air with hydrogen in the upper region. These ducts 14 and 15 are connected to each other in the upper region of the main distributor block 2 close to the bottle. The corresponding connection point 16 lies at the height of the horizontal plane 17 shown shaded in FIG. 1, which is the level of sight of FIG. 2. The duct of the second flow-agent connection 14, in FIGS. 1 and 2, runs from left to right towards the continuous vertical bore 8, and opens into an annular clearance 18 which completely surrounds the hollow piston 5 outside. From this annular clearance 18 extend openings 19 as far as the central flow channel 15. There are four openings 19, each arranged at 90° to each other, so that flow agent coming from the second flow-agent connection 14 via the annular clearance 18 and the openings 19 reaches the central flow 15 channel as uniformly as possible. The connection point 16 is thus also the contact surface between the openings 19 and the central flow channel 15.

FIG. 2 shows four fixing screws 20, with which the hollow adapter 9 is screwed to the distributor block 7, forming the main distributor block 2. Also shown outside are four threaded holes 21, by means of which the main distributor block 2 is screwed onto the machine.

A pressure sensor 22 is also indicated at the bottom right in FIG. 2.

In the representation of both figures, the second flow-agent connection 14 in the adapter 9 is connected with a non-return valve 23 towards the left. To the latter, towards the outside left, are connected a first screw coupling 24 and then, furthermore, a second screw coupling 25. By means of these, a supply line 26 is formed, which connects the second flow-agent connection 14 to the control valve 27 with the magnetic coil 28.

In FIG. 1, the holder already mentioned above is to be imagined which, by raising the hollow cylinder 5 upwards in the direction of the arrow 11 comes into tight engagement via the lock-washer surface 29.

The ignition device, which is not represented, on the hollow stamping die 1 is electrically connected via the cable 30 visible in FIG. 2 with a control unit, which is not represented.

The dose of the quantity of hydrogen or methane introduced is timer-controlled via a timer control of the control valve 27. From the connection point 16, this oxidizable constituent (hydrogen or methane) is carried along into an air stream conveyed upwards in the central flow channel 15 and mixed with the air stream to a homogenously distributed mixture. Even after the control valve 27 is cut off, the air continues to flow further upwards into the central flow channel, until it is also finally cut off. This ensures that below the centre of the hollow piston 15 and for the most part below the connection point 16, an oxidizable constituent from the second flow-agent connection 14 is not, or almost not, present.

List of Reference Numbers:
1 stretching die
2 main distributor block
3 sealing duct
4 inner space on the device side
5 hollow piston
6 vertical continuous bore
7 distributor block
8 vertical continuous bore
9 adapter
10, 10' piston seal
11 double arrow (possible movements of the hollow piston 5)
12 pneumatic connection
13 first flow-agent connection (for air)
14 second flow-agent connection (for $H_2$; oxidizable constituents)
15 central flow channel
16 connection point
17 horizontal plane
18 annular clearance
19 openings
20 fixing screw
21 threaded holes
22 pressure sensor
23 non-return valve
24 first screw coupling
25 second screw coupling
26 supply line
27 control valve
28 magnetic coil
29 lock-washer surface
30 ignition cable

What is claimed is:

1. An apparatus for use in a device for the production of containers from a plastic which is deformable by stretch blow molding into a mold having an inner space that corresponds to that of the finished container, said device having a holder for retaining the container, said apparatus having a moveable stretching die (1) guided through the holder to stretch a blank of the deformable plastic, having gas supply channels (26, 14 and 15) and having an igniter (35) arranged to ignite an explosive gas mixture within the stretched plastic blank to expand the plastic blank into mold, wherein the apparatus at an end facing the container has a sealing washer (29) that can be brought into sealing engagement with the holder at an end facing away from the container to permit passage of gas into the container from distribution block (2) and to permit axial movement of stretching die (1) of the apparatus through the holder to stretch the plastic blank, at least one first flow-agent connection (13) of the apparatus being fitted in a first region of the main distributor block (2) facing away from the container and a further flow-agent connection (14) being fitted in a opposite region of main distributor block (2) facing the container, supply channels (26, 14, 15) being interconnected and connection (13) and supply channels (16) and (15) being interconnected such that channel (15) is shared by gases from both of connections (13) and (14).

2. The apparatus according to claim 1, wherein the connection (14) has a rigid, short connection pipe (24, 25) fitted to control valve (27).

3. The apparatus according to claim 1, wherein a hollow piston (5) is fitted in main distributor block (2), said piston being axially moveable and having ring shaped sealing washer (29) on its outer end facing the holder and matching the holder.

4. The apparatus according to claim 2, wherein a hollow piston (5) is fitted in main distributor block (2), said piston being axially moveable and having ring shaped sealing washer (29) on its outer end facing the holder and matching the holder.

5. The apparatus according to claim 1, wherein the main distributor block (2) comprises a sub-distributor block (7) engaged with a hollow adapter (9).

6. The apparatus according to claim 2 wherein the main distributor block (2) comprises a sub-distributor block (7) engaged with a hollow adapter (9).

7. The apparatus according to claim 3 wherein the main distributor block (2) comprises a sub-distributor block (7) engaged with a hollow adapter (9).

8. The apparatus according to claim 1 wherein the stretching die (1) is hollow and igniter (35) is fitted into stretching die (1).

9. The apparatus according to claim 2 wherein the stretching die (1) is hollow and igniter (35) is fitted into stretching die (1).

10. The apparatus of claim 8 wherein igniter (35) is electrically connected to a control unit via cables (30) passing through stretching die (1).

11. The apparatus of claim 9 wherein igniter (35) is electrically connected to a control unit via cables (30) passing through stretching die (1).

12. The apparatus according to claim 3 wherein a sealing duct (3) is fitted into the main distributor block (2) in alignment with hollow piston (5) to guide the stretching die (1).

13. The apparatus according to claim 4 wherein a sealing duct (3) is fitted into the main distributor block (2) in alignment with hollow piston (5) to guide the stretching die (1).

14. The apparatus according to claim 5 wherein a sealing duct (3) is fitted into the main distributor block (2) in alignment with hollow piston (5) to guide the stretching die (1).

15. The apparatus according to claim 8 wherein a sealing duct (3) is fitted into the main distributor block (2) in alignment with hollow piston (5) to guide the stretching die (1).

16. The apparatus according to claim 1 wherein the igniter (35) is fitted in the main distributor block (2).

17. The apparatus according to claim 2 wherein the igniter (35) is fitted in the main distributor block (2).

18. The apparatus according to claim 3 wherein the igniter (35) is fitted in the main distributor block (2).

19. The apparatus according to claim 4 wherein the igniter (35) is fitted in the main distributor block (2).

20. The apparatus according to claim 5 wherein the igniter (35) is fitted in the main distributor block (2).

* * * * *